July 8, 1924.
C. S. WOODS
STRETCHER
Filed May 29, 1922
1,500,858
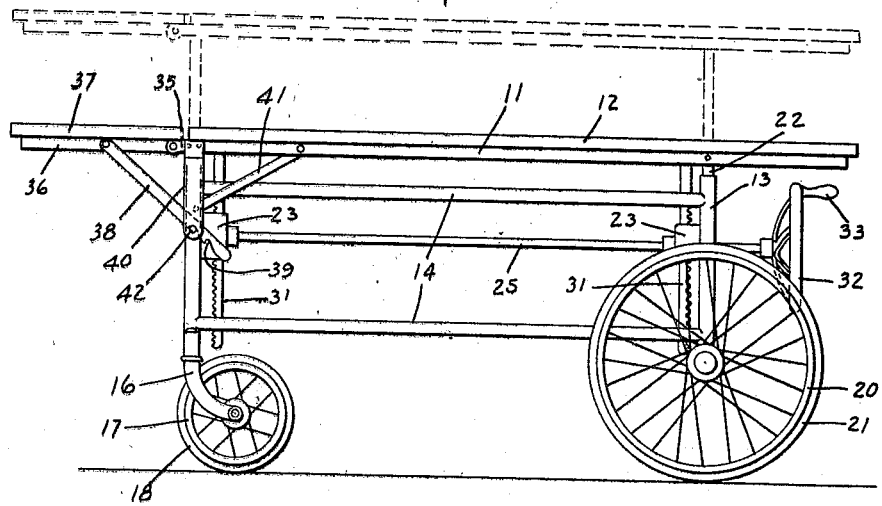
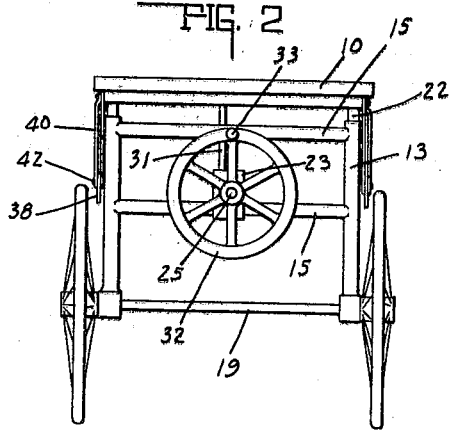
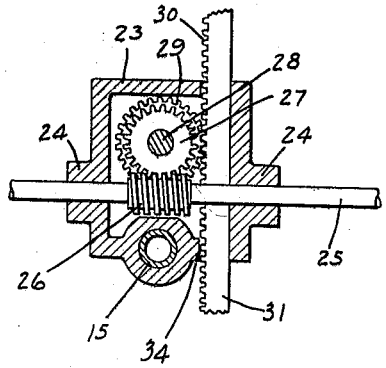
INVENTOR.
CHARLES S. WOODS.
BY
ATTORNEYS.

Patented July 8, 1924.

1,500,858

UNITED STATES PATENT OFFICE.

CHARLES S. WOODS, OF INDIANAPOLIS, INDIANA.

STRETCHER.

Application filed May 29, 1922. Serial No. 564,565.

*To all whom it may concern:*

Be it known that I, CHARLES S. WOODS, a citizen of the United States, and a resident of Indianapolis, county of Marion, and State of Indiana, have invented a certain new and useful Stretcher; and I do hereby declare that the following is a full, clear, and exact description thereof, reference being had to the accompanying drawings, in which like numerals refer to like parts.

This invention relates to a stretcher construction and is particularly adapted for use in hospitals, sanatoriums and the like.

The chief object of this invention is to provide a stretcher construction which is readily portable, and in addition thereto is so constructed that the stretcher may be adjusted to the desired elevation and maintained therein, thereby eliminating the possibility of pulling, doubling or dropping the patients, since the stretcher may be positioned at the exact level with the bed or table; and second, an auxiliary object accomplished by the invention is that nurses, and attendants are relieved from the difficult task of lifting patients.

Another object of the invention is to provide the stretcher with a hingedly supported drop end which not only facilitates the handling of the patient, but also makes the resultant structure satisfactory for operating purposes, especially those classed as eye, ear and nose operations.

The full nature of the invention will be understood from the accompanying drawings and the following description and claims.

In the drawings Fig. 1 is a side elevational view of a portable and adjustable stretcher construction embodying the features of the invention, the dotted lines indicating an elevated position of the stretcher. Fig. 2 is an end view of the stretcher. Fig. 3 is an enlarged central sectional view of the elevating mechanism.

In the drawings 10 indicates a stretcher framework provided with the stretcher or body supporting portion 12. A carriage, preferably rectangular in form, includes the tubular corner members 13, said members being connected together by the side and end members 14 and 15 respectively. Each of a pair of corner members at one end supports a caster yoke 16, in turn supporting a caster wheel 17 having a cushioned tire. Each of the other pair of corner members terminates in a bearing which supports an axle 19. The axle 19 supports the wheels 20 having similarly cushioned treads 21. Depending from and secured to the rectangular stretcher framework 11 are the guides 22. In this instance said guides are telescopically associated with and receivable by the tubular corner members 13.

At each end and upon one of the transverse end members 15 of the carriage forming framework, there is secured a housing 23. The housing 23 provides the bearings 24 for a shaft 25. The shaft 25 within the housing carries a worm 26 which meshes with a worm wheel 27 upon a shaft 28 also journaled in the housing 23 upon an axis transverse to the shaft axis 25. The shaft 28 carries a spur gear 29 which meshes with the teeth 30 of a rack 31 depending from and secured to the rectangular stretcher framework 11.

It will be observed from Fig. 1 and from Fig. 3 that the gear constructions hereinbefore described are duplicated, and that the single shaft 25 extends from housing to housing and also extends through one of the housings and carries upon the extended end a hand wheel 32. For convenience the hand wheel 32 is provided with the handle 33. Rotation of the hand wheel 32 rotates the shafts 28 in the housings 23 which causes the racks 31 to be reciprocated in the aligned slots 34 provided in the housings 23. By means of the racks 31 the stretcher framework 11 is elevated or lowered as desired; and since a worm and worm wheel construction is provided said construction is self-locking, and, therefore, no ratchet means is required to maintain the stretcher and framework 11 in the desired elevated position.

Projecting from the framework 11 are pivotal supports 35, and associated therewith is a drop end framework 36 having the head-supporting portion 37 suitably secured thereto. The framework 36 at each side pivotally supports a latching bar 38 having a plurality of notches 39 therein. Depending from the framework 11 is a member 40 and said member is secured in rigid relation with said framework by means of the brace bar 41. The member 40 carries a locking pin 42 which is seatable in one of the slots 39 to maintain the drop end 37 in the desired position.

The invention claimed is:

1. In a portable stretcher, the combination of a stretcher-supporting portable carriage framework including four tubular corner posts defining said framework, a rectangular stretcher positioned above the same and provided with an equal number of depending guides telescopically associated with said tubular corner posts, a pair of depending racks supported by and depending from said stretcher, a gear associated with each rack, a worm and worm wheel for each gear, and a common shaft for actuating said worms for simultaneously moving said racks to elevate or lower the stretcher upon the framework.

2. A device of the character described in claim 1, characterized by the addition of a housing adapted to form a bearing for the worm, the worm wheel and gear, and a guide for said rack, said housing being supported by the carriage framework.

3. In a portable stretcher, the combination of a stretcher-supporting portable carriage framework including four tubular corner posts defining said framework, a rectangular stretcher positioned above the same and provided with an equal number of depending guides telescopically associated with said tubular corner posts, a pair of depending racks supported by and depending from said stretcher, a gear associated with each rack, a worm and worm wheel for each gear, a common shaft for actuating said worms for simultaneously moving said racks to elevate or lower the stretcher upon the framework, a drop leaf hingedly supported by said stretcher, and adjustable means for positioning said drop leaf and maintaining the same in adjusted position and carried by said stretcher and movable therewith in the elevational and lowering movement thereof.

In witness whereof, I have hereunto affixed my signature.

CHARLES S. WOODS.